(12) United States Patent
Watanabe et al.

(10) Patent No.: US 10,419,164 B2
(45) Date of Patent: Sep. 17, 2019

(54) CONTROL DEVICE, MONITORING SYSTEM AND METHOD OF CHECKING SUCCESS OR FAILURE OF COMMUNICATION

(71) Applicant: DENSO TEN Limited, Kobe-shi, Hyogo (JP)

(72) Inventors: Masatoshi Watanabe, Kobe (JP); Mitsunari Miyamoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 124 days.

(21) Appl. No.: 15/855,411

(22) Filed: Dec. 27, 2017

(65) Prior Publication Data
US 2018/0234209 A1 Aug. 16, 2018

(30) Foreign Application Priority Data

Feb. 15, 2017 (JP) ................. 2017-026141

(51) Int. Cl.
*H04L 1/18* (2006.01)
*H04L 1/08* (2006.01)
*H04L 29/08* (2006.01)
*G07C 5/00* (2006.01)
*H04L 12/26* (2006.01)

(52) U.S. Cl.
CPC .............. *H04L 1/08* (2013.01); *H04L 67/125* (2013.01); *G07C 5/008* (2013.01); *H04L 43/0811* (2013.01); *H04L 43/0817* (2013.01)

(58) Field of Classification Search
None
See application file for complete search history.

(56) References Cited

U.S. PATENT DOCUMENTS

| 2005/0022097 | A1* | 1/2005 | Cheng ................. | H04L 1/1816 714/774 |
| 2007/0088974 | A1* | 4/2007 | Chandwani ......... | G06F 11/0781 714/6.11 |
| 2009/0187654 | A1* | 7/2009 | Raja .................... | H04L 63/0272 709/224 |
| 2014/0115421 | A1* | 4/2014 | Cai ..................... | G06F 11/0754 714/758 |
| 2016/0359592 | A1* | 12/2016 | Kulshreshtha ...... | H04L 63/1425 |

FOREIGN PATENT DOCUMENTS

JP 2015-108944 A 6/2015

* cited by examiner

*Primary Examiner* — Mujtaba M Chaudry
(74) *Attorney, Agent, or Firm* — Oliff PLC

(57) ABSTRACT

There is provided a control device configured to be periodically monitored by a monitoring device, which is connected in communication with the control device, through the communication, the control device. An acquisition unit configured to acquire a monitoring result of the monitoring device corresponding to the period. A determination unit configured to determine success or failure of the communication with the monitoring device, based on a change in the monitoring result acquired by the acquisition unit. A retransmission unit that, when it is determined by the determination unit that the communication has not been established, retransmits a recent transmission content transmitted to the monitoring device.

6 Claims, 6 Drawing Sheets

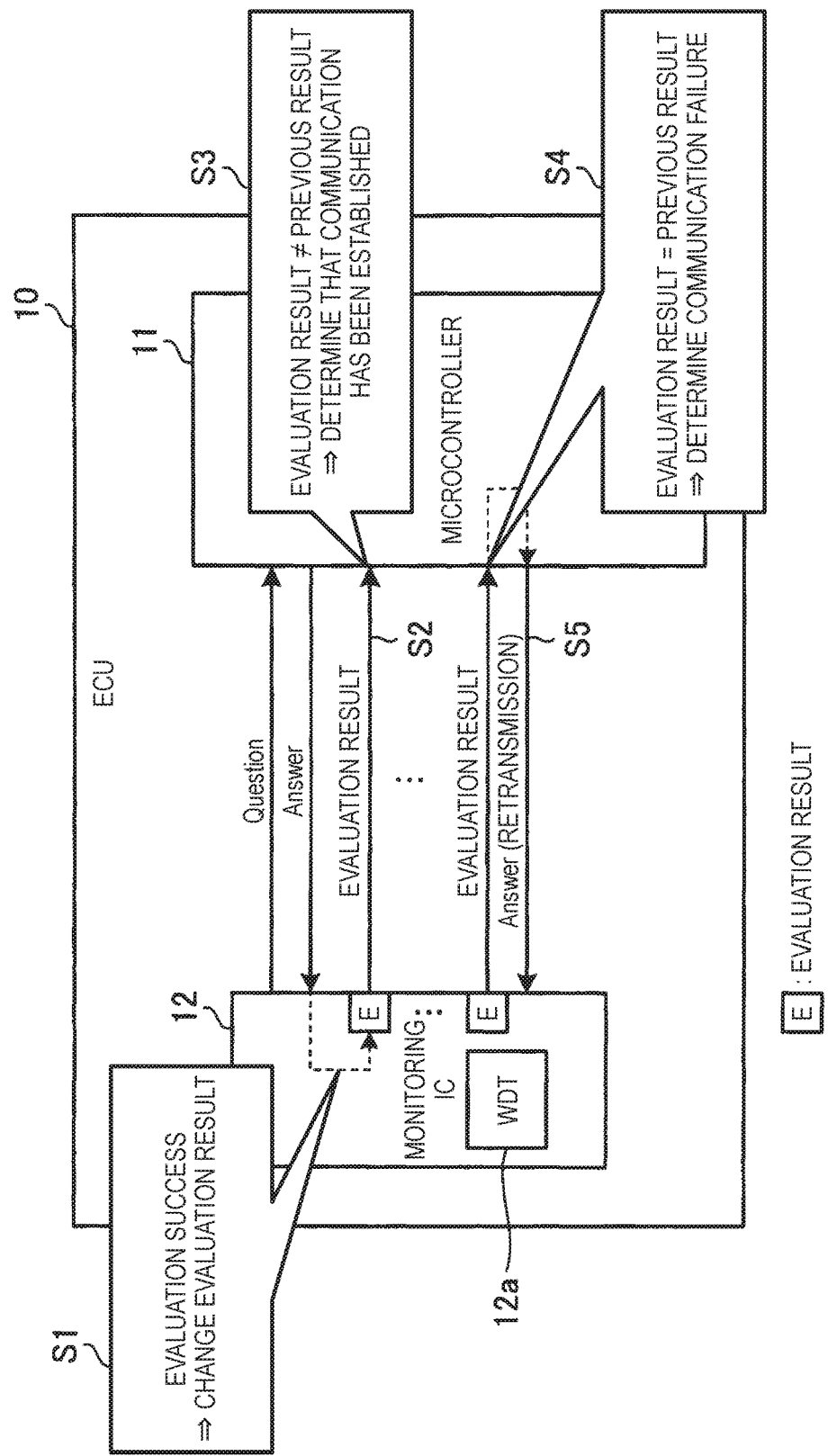

CONTROL DEVICE, MONITORING SYSTEM AND METHOD OF CHECKING SUCCESS OR FAILURE OF COMMUNICATION

CROSS-REFERENCE TO RELATED APPLICATION

This application is based on and claims priority under 35 USC 119 from Japanese Patent Application No. 2017-26141 filed on Feb. 15, 2017.

TECHNICAL FIELD

The disclosed illustrative embodiment relates to a control device, a monitoring system and a method of checking success or failure of communication.

RELATED ART

In the related art, an electronic control unit (ECU) mounted to a vehicle and configured to control a variety of systems of the vehicle such as an engine, a transmission and a car navigation has been known. In the ECU, an embedded microcontroller executes a control program, so that a variety of allotted functions are implemented.

In the meantime, the ECU includes a monitoring IC (Integrated Circuit) configured to monitor whether the microcontroller normally operates. The monitoring IC is a power supply IC, for example. Regarding a method of monitoring the microcontroller, for example, a watch dog counter (hereinafter, referred to as "WDC") monitoring method of monitoring a pulse interval of WDC signals to be output from the microcontroller has been known.

In addition, a Q&A method by serial communication has been suggested as another method of monitoring the microcontroller (for example, refer to Patent Document 1). In the Q&A method, random data corresponding to "question" and a calculation instruction are periodically transmitted from the monitoring IC to the microcontroller, for example. The microcontroller calculates the random data by a designated calculation instruction, and transmits a calculation result thereof to the monitoring IC, as "answer".

Then, the monitoring IC determines that the microcontroller is operationally abnormal when the answer of the microcontroller is not returned at prescribed communication timing or an evaluated result of the answer is not an expected value, and resets the microcontroller, for example.

Patent Document 1: JP-A-2015-108944

However, in the above related art, there are rooms for further improvement on preventing the microcontroller from being unnecessarily reset due to a minor communication abnormality.

Specifically, when the Q&A method is used, even though the answer from the microcontroller is damaged due to an instantaneous noise and the like and is determined as false data by a parity check or the like at the monitoring IC-side and thus communication fails, it is not possible to check success or failure of communication at the microcontroller-side.

Also, in the Q&A method, since the communication timing and the like are also finely prescribed, it is not possible to randomly retransmit the answer from the microcontroller-side. For this reason, the monitoring IC-side may determine time-out of the answer due to influences of one instantaneous noise and the like and reset the microcontroller.

SUMMARY

It is therefore an object of the present invention is to provide a control device, a monitoring system and a method of checking success or failure of communication capable of preventing an unnecessary reset due to a minor communication abnormality.

According to an aspect of the embodiment of the present invention, there is provided a control device configured to be periodically monitored by a monitoring device, which is connected in communication with the control device, through the communication, the control device including an acquisition unit configured to acquire a monitoring result of the monitoring device corresponding to the period, a determination unit configured to determine success or failure of the communication with the monitoring device, based on a change in the monitoring result acquired by the acquisition unit, and a retransmission unit that, when it is determined by the determination unit that the communication has not been established, retransmits a recent transmission content transmitted to the monitoring device.

According to one aspect of the illustrative embodiment, it is possible to prevent an unnecessary reset due to a minor communication abnormality.

BRIEF DESCRIPTION OF THE DRAWINGS

Exemplary embodiment of the present invention will be described in detailed based on the following figures, wherein:

FIG. 1C illustrates an outline of a method of checking success or failure of communication in accordance with an illustrative embodiment;

DETAILED DESCRIPTION

Figure 1A:
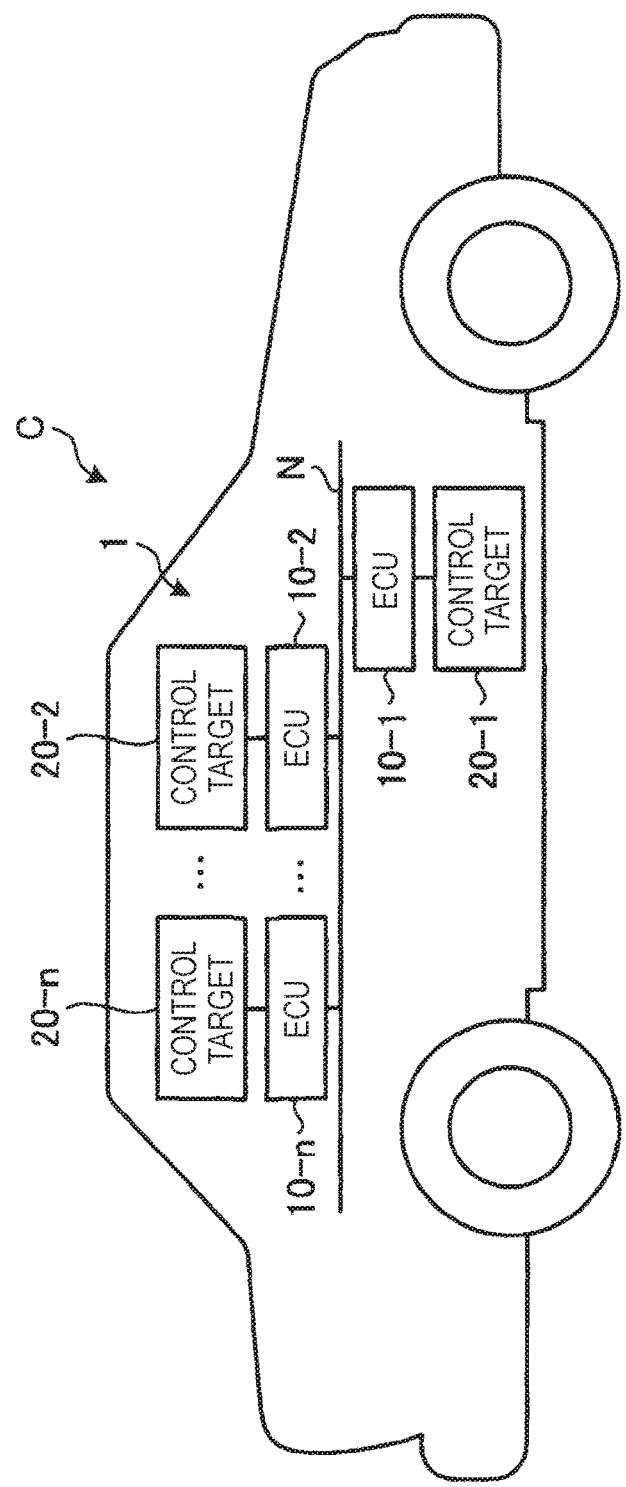
FIG. 1A illustrates an outline of an in-vehicle system.

Hereinafter, an illustrative embodiment of the control device, the monitoring system and the method of checking success or failure of communication of the disclosure will be described in detail with reference to the accompanying drawings. In the meantime, it should be noted that the disclosure is not limited to the illustrative embodiment.

In the below, after describing an outline of the method of checking success or failure of communication in accordance with the illustrative embodiment with reference to FIGS. 1A to 1C, an ECU 10 (which corresponds to an example of "monitoring system") and a microcontroller 11 (which corresponds to an example of "control device") to which the method of checking success or failure of communication in accordance with the illustrative embodiment is applied will be described with reference to FIGS. 2 to 4.

First, an outline of the method of checking success or failure of communication in accordance with the illustrative embodiment is described with reference to FIGS. 1A to 1C. FIG. 1A illustrates an outline of an in-vehicle system 1. FIG. 1B illustrates an outline of the conventional configuration, which is a comparative example. FIG. 1C illustrates an outline of the method of checking success or failure of communication in accordance with the illustrative embodiment. In the meantime, a reference numeral "n" in FIG. 1A is any natural number of 1 or greater. Also, in FIG. 1B, a symbol (') is attached to the reference numerals of the constitutional elements for distinction with the illustrative embodiment.

As shown in FIG. 1A, a vehicle C includes an in-vehicle system 1. The in-vehicle system 1 includes a plurality of ECUs 10-1 to 10-n. The ECUs 10-1 to 10-n are connected in communication with each other by a network N such as a CAN (Controller Area Network), and are respectively configured to execute a control program, thereby electronically controlling control targets 20-1 to 20-n. The control targets 20-1 to 20-n are diverse systems such as an engine, a transmission, a car navigation and the like, for example.

Figure 1B:
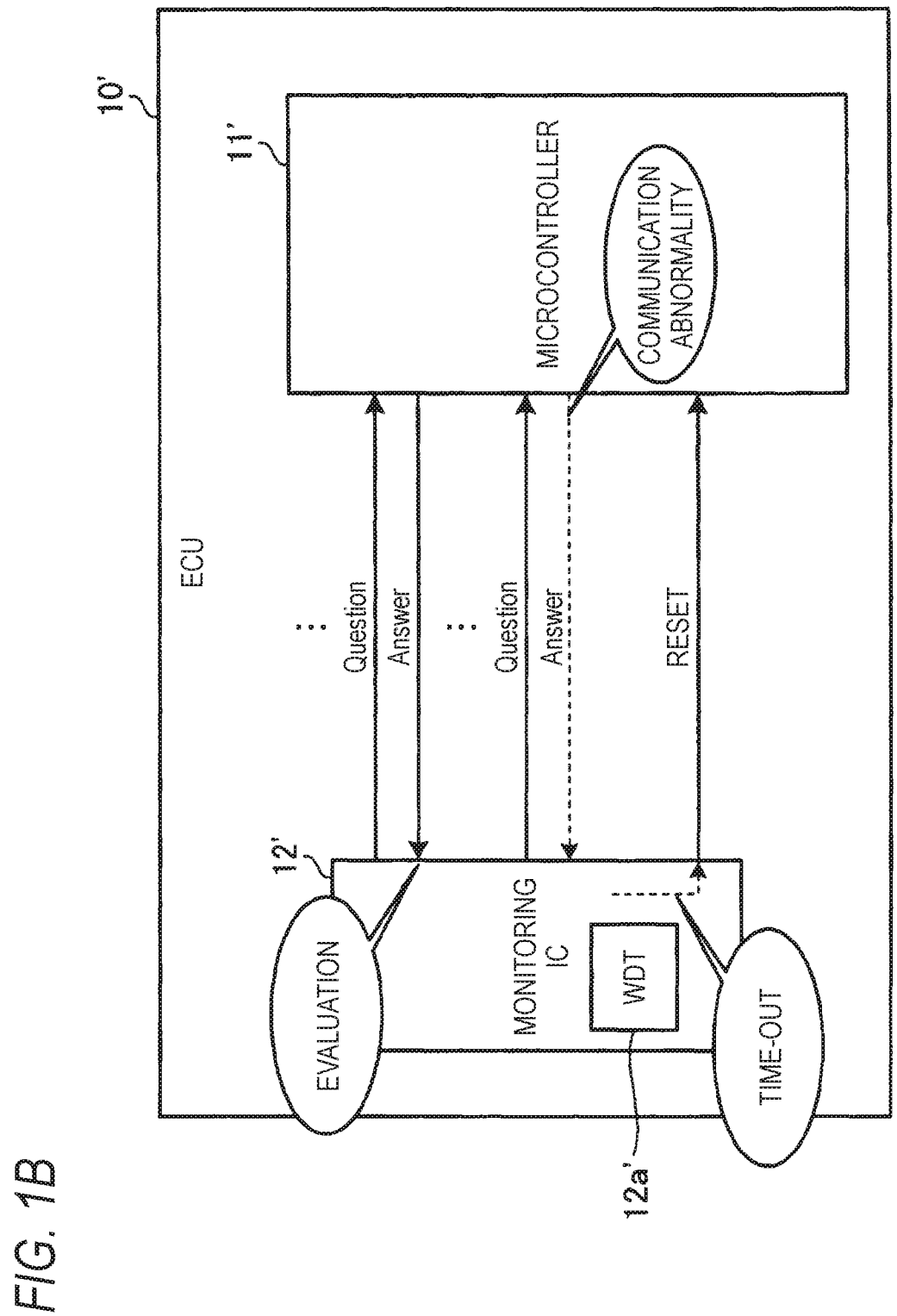
FIG. 1B illustrates an outline of the conventional configuration, which is a comparative example.

Herein, as shown in FIG. 1B, an ECU 10' of the conventional configuration includes a microcontroller 11' and a monitoring IC 12'. The microcontroller 11' is a main processing unit of the ECU 10', and is configured to execute a control program, thereby implementing a variety of allotted functions.

The monitoring IC 12' is configured to monitor an operating state of the microcontroller 11' by a Q&A method. That is, as shown in FIG. 1B, a question is transmitted from the monitoring IC 12', and an answer is transmitted from the microcontroller 11', in response to the question. In the meantime, the question and the answer are exchanged through serial communication by an SPI (Serial Peripheral Interface), for example.

The monitoring IC 12' is configured to "evaluate" the answer received from the microcontroller 11'. The exchange is periodically repeated. When an evaluation result is NG, the monitoring IC 12' resets the microcontroller 11', for example, in correspondence to the result. The above process is performed when communication has been established in the Q&A method.

Herein, as shown in FIG. 1B, it is assumed that "communication abnormality" has occurred due to instantaneous noise and the like upon transmission of the answer. That is, FIG.1B depicts a case where communication has not been established upon transmission of the answer.

In this case, the monitoring IC 12' does not perform "evaluation" of the answer, and the monitoring IC 12' waits for an answer by a WDT (a watch dog timer) 12'a provided therein, for example. However, since the microcontroller 11' cannot check success or failure of communication of the transmitted answer, it cannot timely retransmit the answer.

When the monitoring IC 12' determines "time-out" by the WDT 12'a, the microcontroller 11' is unnecessarily reset from the monitoring IC 12' due to the minor communication abnormality.

Therefore, as shown in FIG. 1C, in the method of checking success or failure of communication in accordance with the illustrative embodiment, the monitoring IC 12 first has an evaluation result "E", receives an answer from the microcontroller 11, and changes the evaluation result "E" when the evaluation itself is successful, irrespective of OK or NG (step S1).

Then, the microcontroller 11 acquires the evaluation result "E" from the monitoring IC 12 through serial communication or the like after transmitting the answer (step S2), and determines that the recent answer transmission has been successfully completed (communication has been established) when the acquired evaluation result and a previous evaluation result (hereinafter, referred to as "previous result") are different from each other (step S3).

Also, when the acquired evaluation result and the previous result are the same, the microcontroller 11 determines that the recent answer transmission has failed (communication failure) (step S4), and retransmits the answer (step S5). Meanwhile, in the below, "communication failure" may also be described as "communication has not been established".

When the retransmitted answer can be received by the monitoring IC 12 and is evaluated, the microcontroller 11 can be prevented from being reset from the monitoring IC 12 due to at least the minor communication abnormality.

On the other hand, when the retransmitted answer cannot be received by the monitoring IC 12 and the retransmission is thus repeated, the communication abnormality is not minor. In this case, the monitoring IC 12 determines the time-out by the WDT 12a, for example, and performs the necessary reset.

The method of checking success or failure of communication in accordance with the illustrative embodiment will be described in more detail with reference to FIG. 2 and thereafter, particularly FIG. 3. In the below, the ECU 10 and the microcontroller 11 to which the method of checking success or failure of communication is applied is described in more detail.

Figure 2:
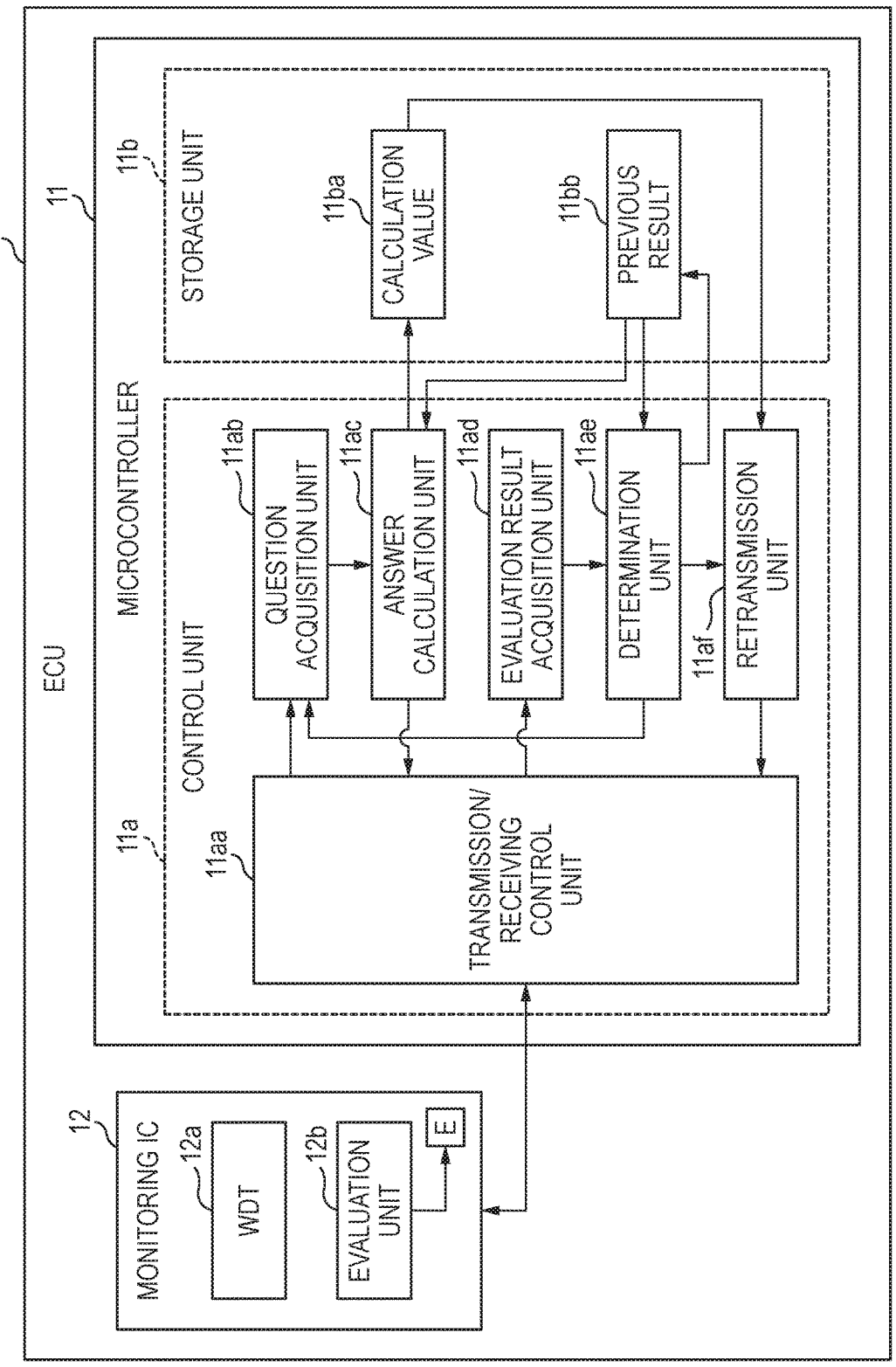
FIG. 2 is a block diagram of an ECU in accordance with the illustrative embodiment.

FIG. 2 is a block diagram of the ECU 10 in accordance with the illustrative embodiment. Meanwhile, in FIG. 2, only the constitutional elements required to describe features of the illustrative embodiment are shown by functional blocks, and the general constitutional elements are not shown.

In other words, the respective constitutional elements shown in FIG. 2 are functional concepts, and are not necessarily required to be physically configured as shown. For example, a specific form of dispersion/integration of the respective functional blocks is not limited to the shown example, and all or some thereof may be functionally or physically dispersed/integrated in an arbitrary unit, depending on diverse loads, using situations and the like.

As shown in FIG. 2, the ECU 10 includes the microcontroller 11 and the monitoring IC 12. The monitoring IC 12 is first described. The monitoring IC 12 includes a WDT 12a and an evaluation unit 12b. Also, the monitoring IC 12 has an evaluation result "E".

As described above, the WDT 12a is a watch dog timer. The evaluation unit 12b is configured to evaluate an evaluation result received from the microcontroller 11, and determines OK when the answer is an expected value and otherwise determines NG. Also, the evaluation unit 12b changes the evaluation result "E" when the evaluation has been successfully completed, irrespective of OK or NG.

Specifically, in the illustrative embodiment, the evaluation result "E" is a counter of which a value can be changed between "0" to "4", for example. When the answer from the microcontroller 11 is OK, the evaluation unit 12b decreases the evaluation result "E". Also, when the answer from the microcontroller 11 is NG, the evaluation unit 12b increases the evaluation result "E".

Subsequently, the microcontroller 11 is described. The microcontroller 11 includes a control unit 11a and a storage unit 11b. The control unit 11a includes a transmission/receiving control unit 11aa, a question acquisition unit 11ab, an answer calculation unit 11ac, an evaluation result acquisition unit 11ad, a determination unit 11ae, and a retransmission unit 11af. The storage unit 11b is configured to store therein a calculation value 11ba and a previous result 11bb.

The control unit 11a is a CPU (Central Processing Unit), for example, and is configured to execute a control program for implementing functions allotted to the ECU 10 while using a ROM (Read Only Memory), a RAM (Random Access Memory), a register and the like corresponding to the storage unit 11b.

Specifically, the control unit 11a is configured to read out and execute a control program (not shown) stored in the ROM. Also, during the execution of the control program, the control unit 11a is configured to exchange data with the monitoring IC 12, i.e., to execute Q&A processing while it is monitored through the Q&A method by the monitoring IC 12.

FIG. 2 mainly depicts the constitutional elements relating to the Q&A processing. The control unit 11a functions as the transmission/receiving control unit 11aa, the question acquisition unit 11ab, the answer calculation unit 11ac, the evaluation result acquisition unit 11ad, the determination unit 11ae, and the retransmission unit 11af by reading out and executing a program (not shown) stored in the ROM.

The transmission/receiving control unit 11aa is configured to control transmission and receiving of data between the microcontroller 11 and the monitoring IC 12. The transmission/receiving control unit 11aa is configured to pass the question received from the monitoring IC 12 to the question acquisition unit 11ab. Also, the transmission/receiving control unit 11aa is configured to pass the evaluation result "E" received from the monitoring IC 12 to the evaluation result acquisition unit 11ad.

Also, the transmission/receiving control unit 11aa is configured to transmit the answer received from the answer calculation unit 11ac to the monitoring IC 12. Also, the transmission/receiving control unit 11aa is configured to retransmit the answer received from the retransmission unit 11af to the monitoring IC 12.

The question acquisition unit 11ab is configured to acquire the question (for example, random data and a calculation instruction) from the monitoring IC 12 via the transmission/receiving control unit 11aa, and to pass the same to the answer calculation unit 11ac.

The answer calculation unit 11ac is configured to execute calculation by a calculation instruction of the passed question, and to pass a calculation result to the transmission/receiving control unit 11aa, as an answer. Also, the answer calculation unit 11ac is configured to store the calculation result in the storage unit 11b, as the calculation value 11ba.

In the meantime, the answer calculation unit 11ac is configured to refer to the previous result 11bb, which is a value of the previous evaluation result "E" stored in the storage unit 11b, prior to the execution of calculation, and unconditionally sets a false answer when the value is a predetermined value and passes the same to the transmission/receiving control unit 11aa. In the illustrative embodiment, the predetermined value is "0". This will be described later with reference to FIG. 3.

The evaluation result acquisition unit 11ad is configured to acquire the evaluation result "E" from the monitoring IC 12 via the transmission/receiving control unit 11aa, and to pass the same to the determination unit 11ae. The determination unit 11ae is configured to compare the passed evaluation result "E" and the previous result 11bb stored in the storage unit 11b, and determines that the recent answer has reached the monitoring IC 12, i.e., that communication has been established when both are different from each other. In this case, the determination unit 11ae instructs the question acquisition unit 11ab to acquire a next question.

Also, when the evaluation result "E" and the previous result 11bb are the same as a result of the comparison thereof, the determination unit 11ae determines that the recent answer has not reached the monitoring IC 12, i.e., that communication has not been established. In this case, the determination unit 11ae instructs the retransmission unit 11af to retransmit the recent answer. Also, the determination unit 11ae updates the previous result 11bb with a value of the evaluation result "E" acquired this time from the evaluation result acquisition unit 11ad.

When the retransmission unit 11af is instructed to retransmit the recent answer by the determination unit 11ae, the retransmission unit 11af reads out and sets the calculation value 11ba as an answer, and retransmits the same to the transmission/receiving control unit 11aa.

Following to the above description, a processing flow of the method of checking success or failure of communication in accordance with the illustrative embodiment is described with reference to FIG. 3. FIG. 3 depicts a processing sequence of the method of checking success or failure of communication in accordance with the illustrative embodiment. Meanwhile, in FIG. 3, "threshold value" indicates a threshold value of the WDT 12a. Also, in FIG. 3, the values "0" to "4" of "evaluation result" indicate values that can be set as the evaluation result "E". For convenience of descriptions, the value is set to "4" before time t1.

Figure 3:
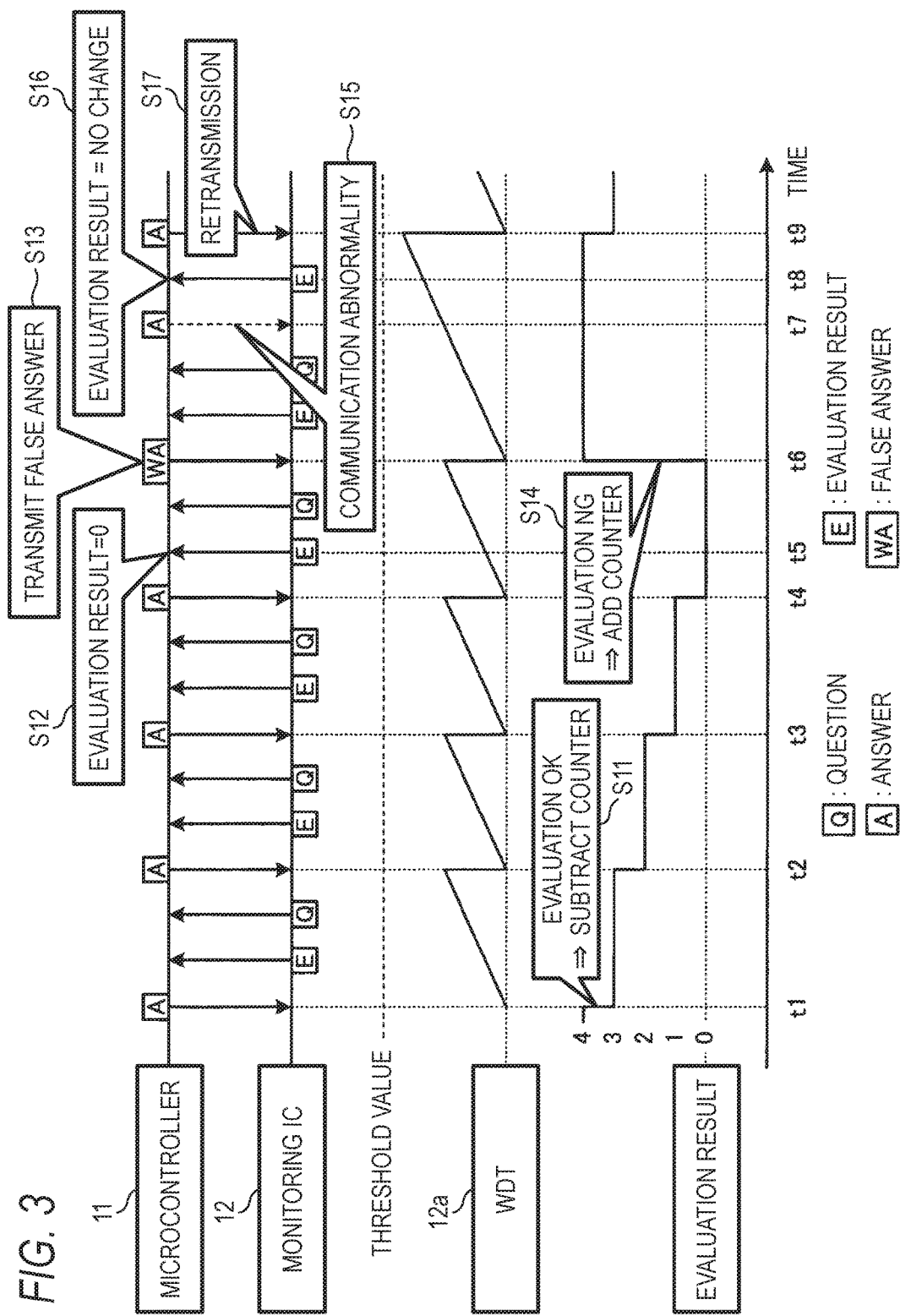
FIG. 3 depicts a processing sequence of the method of checking success or failure of communication in accordance with the illustrative embodiment.

As shown in FIG. 3, it is assumed that the answer "A" is transmitted from the microcontroller 11 to the monitoring IC 12 at time t1. When communication is established, so that the answer "A" reaches the monitoring IC 12, the evaluation is performed and the evaluation result is OK, the monitoring IC 12 subtracts the counter indicative of the evaluation result "E" (step S11). For example, herein, "1" is subtracted ("−1").

Then, the microcontroller 11 acquires the evaluation result "E" from the monitoring IC 12, and compares the same with the previous result 11bb. When both are different from each other, the microcontroller 11 checks that communication has been established, and acquires a next question "Q" from the monitoring IC 12 (refer to times t1 to t2). Then, the microcontroller 11 calculates a next answer "A" to the acquired question "Q", and newly transmits the same to the monitoring IC 12.

The above process is periodically repeated up to times t1 to t4. In this case, at time t4, the evaluation result "E" becomes "0". In the meantime, as shown, the WDT 12a is reset whenever the answer "A" is received.

Herein, at time t5, when the microcontroller 11 acquires the evaluation result "E", the value is "0" (step S12). In this case, as described above, the answer calculation unit 11ac of the microcontroller 11 unconditionally sets a false answer. That is, as shown, the microcontroller 11 transmits a false answer "WA" toward the monitoring IC 12 (step S13).

At time t6, the monitoring IC 12 receives the false answer "WA" and evaluates the false answer, as NG. In this case, the monitoring IC 12 adds the counter indicative of the evaluation result "E" (step S14). For example, herein, "4" is added ("+4").

Thereby, the counter indicative of the evaluation result "E" is reset, so that the counter can be cyclically used. That is, it is not necessary to secure a variable region, in which a large value can be taken as the counter, in the monitoring IC 12. In other words, it is possible to simply configure the monitoring IC 12.

As shown in FIG. 3, it is assumed that at time t7, the minor "communication abnormality" has occurred upon transmission of the answer "A" from the microcontroller 11

(step S15). In this case, since the answer "A" is not evaluated in the monitoring IC 12, the evaluation result "E", which is acquired at time t8 by the microcontroller 11, is not changed from the previous result (step S16).

Thereby, since the microcontroller 11 can check that communication has not been established with respect to the transmission of the recent answer "A", it retransmits the answer "A", which was transmitted at time t7, at time t9 (step S17).

Subsequently, a sequence of processing that is to be executed by the microcontroller 11 of the ECU 10 in accordance with the illustrative embodiment is described with reference to FIG. 4. FIG. 4 is a flowchart depicting a sequence of processing that is to be executed by the microcontroller 11 of the ECU 10 in accordance with the illustrative embodiment. In the meantime, herein, a sequence of processing that is to be executed by the microcontroller 11 with respect to the Q&A processing is shown.

Figure 4:
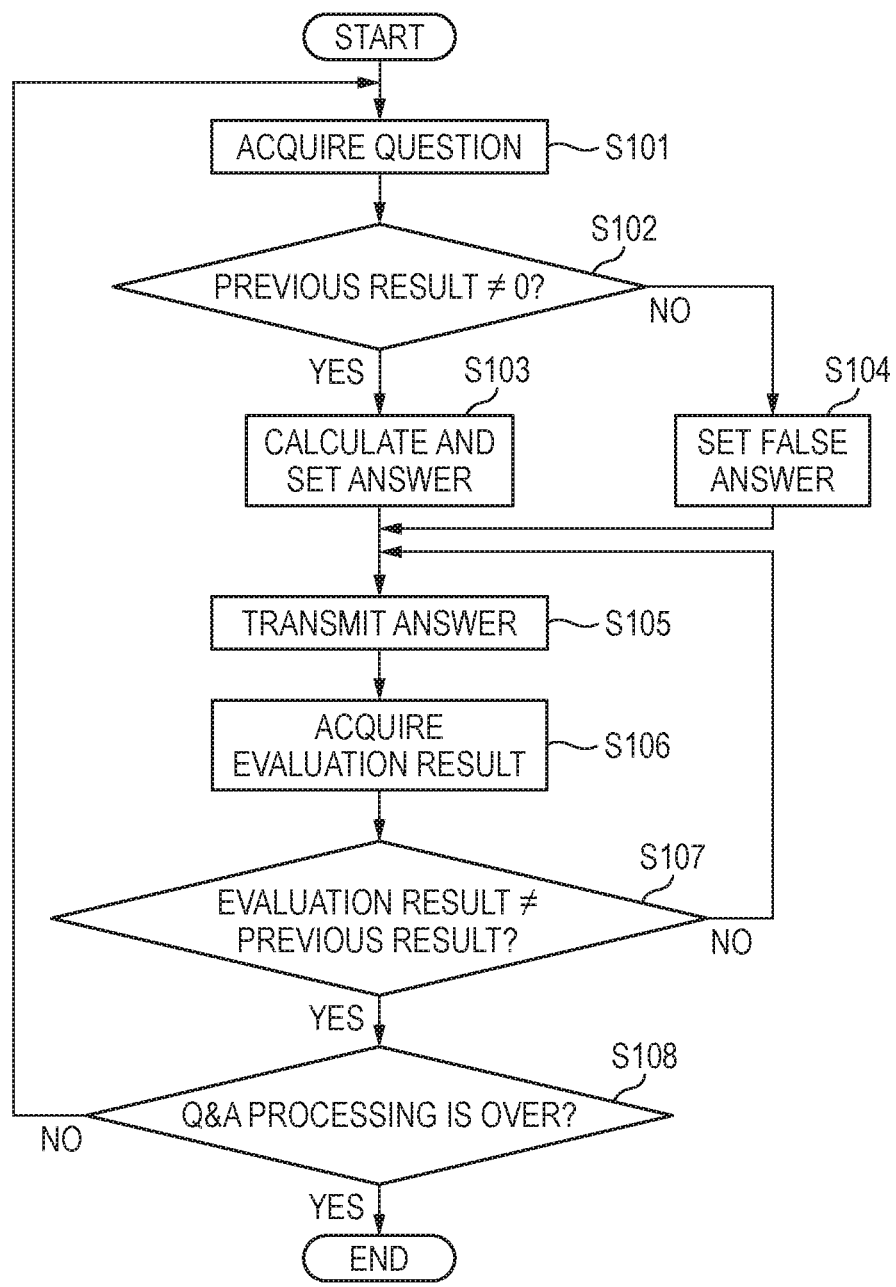
FIG. 4 is a flowchart depicting a sequence of processing that is to be executed by a microcontroller of the ECU in accordance with the illustrative embodiment.

As shown in FIG. 4, regarding the Q&A processing, the question acquisition unit 11ab first acquires a question "Q" from the monitoring IC 12 (step S101). The question acquisition unit 11ab passes the acquired question "Q" to the answer calculation unit 11ac.

The answer calculation unit 11ac first refers to the previous result 11bb of the storage unit 11b, and determines whether the previous result 11bb is not "0" (step S102). Herein, when the previous result 11bb is not "0" (step S102, Yes), the answer calculation unit 11ac calculates and sets an answer "A" to the question "Q" passed from the question acquisition unit 11ab (step S103).

On the other hand, when the previous result 11bb is "0" (step S102, No), the answer calculation unit 11ac unconditionally sets a false answer "WA" with respect to the answer "A" (step S104).

Then, the transmission/receiving control unit 11aa transmits the answer "A" (the false answer "WA" when the processing of step S104 has been executed) set by the answer calculation unit 11ac to the monitoring IC 12 (step S105).

Continuously, the evaluation result acquisition unit 11ad acquires the evaluation result "E" from the monitoring IC 12 via the transmission/receiving control unit 11aa (step S106). The evaluation result acquisition unit 11ad passes the acquired evaluation result "E" to the determination unit 11ae.

The determination unit 11ae compares the passed evaluation result "E" and the previous result 11bb, and determines whether the evaluation result "E" and the previous result 11bb are different from each other (step S107). Herein, when it is determined that evaluation result "E" and the previous result 11bb are different from each other (step S107, Yes), the control shifts to step S108.

On the other hand, when it is determined that the evaluation result "E" and the previous result 11bb are the same (step S107, No), the control shifts to step S105, and the answer "A" is retransmitted.

In step S108, it is determined whether the Q&A processing is over. When it is determined that the Q&A processing is not over (step S108, No), the processing of step S101 and thereafter is repeated. When it is determined that the Q&A processing is over (step S108, Yes), the processing is over.

As described above, the microcontroller 11 (which corresponds to an example of "control device") in accordance with the illustrative embodiment is the microcontroller 11 that is to be periodically monitored through the communication by the monitoring IC 12 (which corresponds to an example of "monitoring device") connected in communication with the microcomputer, and includes the evaluation result acquisition unit 11ad (which corresponds to an example of "evaluation unit"), the determination unit 11ae, and the retransmission unit 11af.

The evaluation result acquisition unit 11ad periodically acquires the evaluation result "E" (which corresponds to an example of "monitoring result") of the monitoring IC 12. The determination unit 11ae determines whether communication with the monitoring IC 12 has been successfully completed, based on a change in the evaluation result "E" acquired by the evaluation result acquisition unit 11ad. When it is determined by the determination unit 11ae that the communication has not been established, the retransmission unit 11af retransmits the recent transmission content transmitted to the monitoring IC 12.

Therefore, according to the microcontroller 11 of the illustrative embodiment, it is possible to prevent the microcontroller from being unnecessarily reset due to the minor communication abnormality.

Also, the microcontroller 11 is monitored by the monitoring IC 12 through the Q&A method (the question and answer method) of transmitting the answer "A" corresponding to the transmission content equivalent to the question "Q" from the monitoring IC 12, the evaluation result "E" is the evaluation result "E" of the answer "A", and when the evaluation of the answer "A" is successful, the monitoring IC 12 updates the evaluation result "E" so that it becomes an evaluation result different from the previous period.

When the evaluation result "E" acquired by the evaluation result acquisition unit 11ad is the same at this period and at the previous period, the determination unit 11ae determines that communication has not been established. Therefore, according to the microcontroller 11 of the illustrative embodiment, it is possible to prevent the microcontroller from being unnecessarily reset due to the minor communication abnormality by the easy determination content without the complicated processing, i.e., by the simple configuration.

Also, the monitoring IC 12 has the counter corresponding to the evaluation result "E", subtracts the counter when the answer "A" is a right answer, and adds the counter when the answer "A" is the false answer "WA". Therefore, according to the ECU 10 (which corresponds to an example of "monitoring system") of the illustrative embodiment, it is possible to check the evaluation success by the easy method of subtracting and adding the counter, and to easily enable the microcontroller 11 to determine that communication has not been established, when the evaluation is not successful. Also, it is not necessary to secure the large variable region for the evaluation result "E" in the monitoring IC 12, so that it is possible to simplify the configuration of the monitoring IC 12. That is, it is possible to prevent the unnecessary reset due to the minor communication abnormality by the simple configuration.

Also, the answer calculation unit 11ac configured to calculate the answer "A" in accordance with the transmission content of the question "Q" is further provided. When the evaluation result "E" of the previous period acquired by the evaluation result acquisition unit 11ad is "0" (which corresponds to an example of "predetermined value"), the answer calculation unit 11ac unconditionally transmits the false answer "WA" to the monitoring IC 12. Therefore, according to the microcontroller 11 of the illustrative embodiment, it is possible to prevent the unnecessary reset due to the minor communication abnormality while using the easy method of transmitting the false answer "WA" to cyclically use the counter.

Meanwhile, in the illustrative embodiment, the evaluation result "E" held by the monitoring IC 12 is the value of "0" to "4". However, the range of the values to be taken is not limited. Therefore, the value to be subtracted or added is not also limited to the examples (for example, −1 or +4) of the illustrative embodiment.

Also, in the illustrative embodiment, the monitoring IC 12 evaluates the answer "A", subtracts the counter indicative of the evaluation result "E" when the evaluation result is OK, and adds the counter when the evaluation result is NG. However, the monitoring IC 12 may add the counter when the evaluation result is OK and subtract the counter when the evaluation result is NG.

The above configuration depends on the specification of the monitoring IC 12. In the illustrative embodiment, in case that the evaluation of the answer "A" in the monitoring IC 12 is successful, when the evaluation result "E" is inevitably different at previous time and at this time, the value that can be taken as the counter and the adding and subtracting roles may be appropriately changed depending on the specification of the monitoring IC 12.

Also, in the illustrative embodiment, when acquiring the evaluation result "E", the serial communication is used on the basis of the Q&A method. However, the acquisition method is not limited thereto. For example, the ECU 10 may be provided with a common memory region that can be accessed from both the microcontroller 11 and the monitoring IC 12, the monitoring IC 12 may write the evaluation result "E" in the common memory region and the microcontroller 11 may read out the written evaluation result "E".

Also, in the illustrative embodiment, the ECU 10 is provided to the vehicle C. However, the ECU may also be provided to a ship, an airplane and the like, without being limited to the vehicle C.

The additional effects and modified embodiments can be easily conceived by one skilled in the art. For this reason, the wider aspect of the disclosure is not limited to the above described details and the representative illustrative embodiment. Therefore, the illustrative embodiment can be diversely changed without departing from the collective conceptual spirit or range of the disclosure defined by the claims and equivalents thereto.

What is claimed is:

1. A control device configured to be periodically monitored by a monitoring device, which is connected in communication with the control device, through the communication, the control device comprising:
an acquisition unit configured to acquire a monitoring result of the monitoring device corresponding to the period;
a determination unit configured to determine success or failure of the communication with the monitoring device, based on a change in the monitoring result acquired by the acquisition unit, and
a retransmission unit that, when it is determined by the determination unit that the communication has not been established, retransmits a recent transmission content transmitted to the monitoring device.

2. The control device according to claim 1,
wherein the control device is configured to be monitored by the monitoring device through a question and answer method of transmitting an answer corresponding to a transmission content equivalent to a question from the monitoring device,
wherein the monitoring result is an evaluation result of the answer by the monitoring device,
wherein the monitoring device updates the evaluation result so that the evaluation result becomes an evaluation result different from a previous period, when evaluation of the answer is successful, and
wherein the determination unit determines that the communication has not been established, when the evaluation result acquired by the acquisition unit is the same at this period and at the previous period.

3. The control device according to claim 2, wherein the monitoring device has a counter corresponding to the evaluation result, and
wherein when the answer is a right answer, the monitoring device subtracts the counter, and when the answer is a false answer, the monitoring device adds the counter.

4. The control device according to claim 3, further comprising a calculation unit configured to calculate the answer, in correspondence to the transmission content of the question,
wherein when the evaluation result of the previous period acquired by the acquisition unit is a predetermined value, the calculation unit transmits a false answer to the monitoring device.

5. A monitoring system comprising:
a monitoring device, and
a control device connected in communication with the monitoring device,
wherein the monitoring device is configured to periodically monitor the control device through the communication, and
wherein the control device comprises:
an acquisition unit configured to acquire a monitoring result of the monitoring device corresponding to the period;
a determination unit configured to determine success or failure of the communication with the monitoring device, based on a change in the monitoring result acquired by the acquisition unit, and
a retransmission unit that, when it is determined by the determination unit that the communication has not been established, retransmits a recent transmission content transmitted to the monitoring device.

6. A method of checking success or failure of communication by using a control device configured to be periodically monitored by a monitoring device, which is connected in communication with the control device, through the communication, the method comprising:
acquiring a monitoring result of the monitoring device corresponding to the period;
determining success or failure of the communication with the monitoring device, based on a change in the monitoring result acquired by the acquisition process, and
retransmitting a recent transmission content transmitted to the monitoring device when it is determined by the determination process that the communication has not been established.

* * * * *